United States Patent
Katahanas et al.

(10) Patent No.: US 12,547,431 B2
(45) Date of Patent: *Feb. 10, 2026

(54) DATA STORAGE AND RETRIEVAL SYSTEM FOR SUBDIVIDING UNSTRUCTURED PLATFORM-AGNOSTIC USER INPUT INTO PLATFORM-SPECIFIC DATA OBJECTS AND DATA ENTITIES

(71) Applicants: Atlassian Pty Ltd., Sydney (AU); Atlassian US, Inc., San Francisco, CA (US)

(72) Inventors: Jonathan George Katahanas, Sydney (AU); Abhinav Kishore, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 204 days.

This patent is subject to a terminal disclaimer.

(21) Appl. No.: 18/234,831

(22) Filed: Aug. 16, 2023

(65) Prior Publication Data
US 2023/0393866 A1  Dec. 7, 2023

Related U.S. Application Data

(63) Continuation of application No. 17/489,527, filed on Sep. 29, 2021, now Pat. No. 11,734,027.

(51) Int. Cl.
| | | |
|---|---|---|
| *G06F 9/451* | (2018.01) | |
| *G06F 3/0481* | (2022.01) | |
| *G06F 3/14* | (2006.01) | |
| *G06F 16/93* | (2019.01) | |
| *G06Q 10/0631* | (2023.01) | |
| *H04L 65/403* | (2022.01) | |
| *G06F 40/30* | (2020.01) | |

(52) U.S. Cl.
CPC ............ *G06F 9/451* (2018.02); *G06F 3/0481* (2013.01); *G06F 3/1454* (2013.01); *G06F 16/93* (2019.01); *G06Q 10/06313* (2013.01); *H04L 65/403* (2013.01); *G06F 40/30* (2020.01)

(58) Field of Classification Search
CPC ........ G06F 9/451; G06F 16/93; G06F 3/0481; G06F 3/1454; G06F 40/30; G06Q 10/06313; H04L 65/403
See application file for complete search history.

(56) References Cited

U.S. PATENT DOCUMENTS

| | | |
|---|---|---|
| 2015/0254370 A1 | 9/2015 | Sexton et al. |
| 2019/0318020 A1 | 10/2019 | Chauhan et al. |
| 2020/0089757 A1 | 3/2020 | Machado et al. |
| 2020/0133661 A1 | 4/2020 | Alexander |

(Continued)

*Primary Examiner* — Stephen S Hong
*Assistant Examiner* — Darrin Hope
(74) *Attorney, Agent, or Firm* — Brownstein Hyatt Farber Schreck, LLP

(57) ABSTRACT

A platform-agnostic input system can render a multiuser input board user interface element at one or more frontends to collect input from multiple users simultaneously. The platform-agnostic input system can maintain an object graph based on positions of objects added to the multiuser input board. The platform-agnostic input system can select branches of the object graph and determine which among a set of platforms in a multiplatform computing system to associate with the data associated with each node of that branch of the object graph.

20 Claims, 6 Drawing Sheets

(56) References Cited

U.S. PATENT DOCUMENTS

| | | |
|---|---|---|
| 2020/0228606 A1 | 7/2020 | San et al. |
| 2020/0272324 A1 | 8/2020 | Chanda et al. |
| 2021/0208775 A1* | 7/2021 | Allington .............. G06F 3/0486 |
| 2022/0342534 A1* | 10/2022 | Chen ..................... G06F 40/177 |

* cited by examiner

DATA STORAGE AND RETRIEVAL SYSTEM FOR SUBDIVIDING UNSTRUCTURED PLATFORM-AGNOSTIC USER INPUT INTO PLATFORM-SPECIFIC DATA OBJECTS AND DATA ENTITIES

CROSS-REFERENCE TO RELATED APPLICATION(S)

This application is a continuation patent application of U.S. patent application Ser. No. 17/489,527, filed Sep. 29, 2021 and titled "Data Storage and Retrieval System for Subdividing Unstructured Platform-Agnostic User Input Into Platform-Specific Data Objects and Data Entities," the disclosure of which is hereby incorporated herein by reference in its entirety.

TECHNICAL FIELD

Embodiments described herein relate to data storage in multiplatform computing environments and, in particular, to systems and methods for generating platform-specific data objects from unstructured platform-agnostic user input.

BACKGROUND

An organization can establish a multiplatform computing environment by self-hosting, or providing its employees with access to, one or more platforms or services to facilitate cooperation and completion of work related to common goals. Such organizations typically rely on each individual platform (or, more specifically, owners or vendors of each platform) to manage access to, and distribution of, organization-owned data associated with each respective platform.

As a result, employees and contractors of an organization maintaining a multiplatform collaborative computing environment are compelled to provide highly structured input to each individual platform, in a manner specific to each individual platform. This requirement introduces and/or exacerbates time and productivity losses associated with context switching between platform, and chills motivation to comprehensively capture and record organization-owned data.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

DETAILED DESCRIPTION

Figure 1:
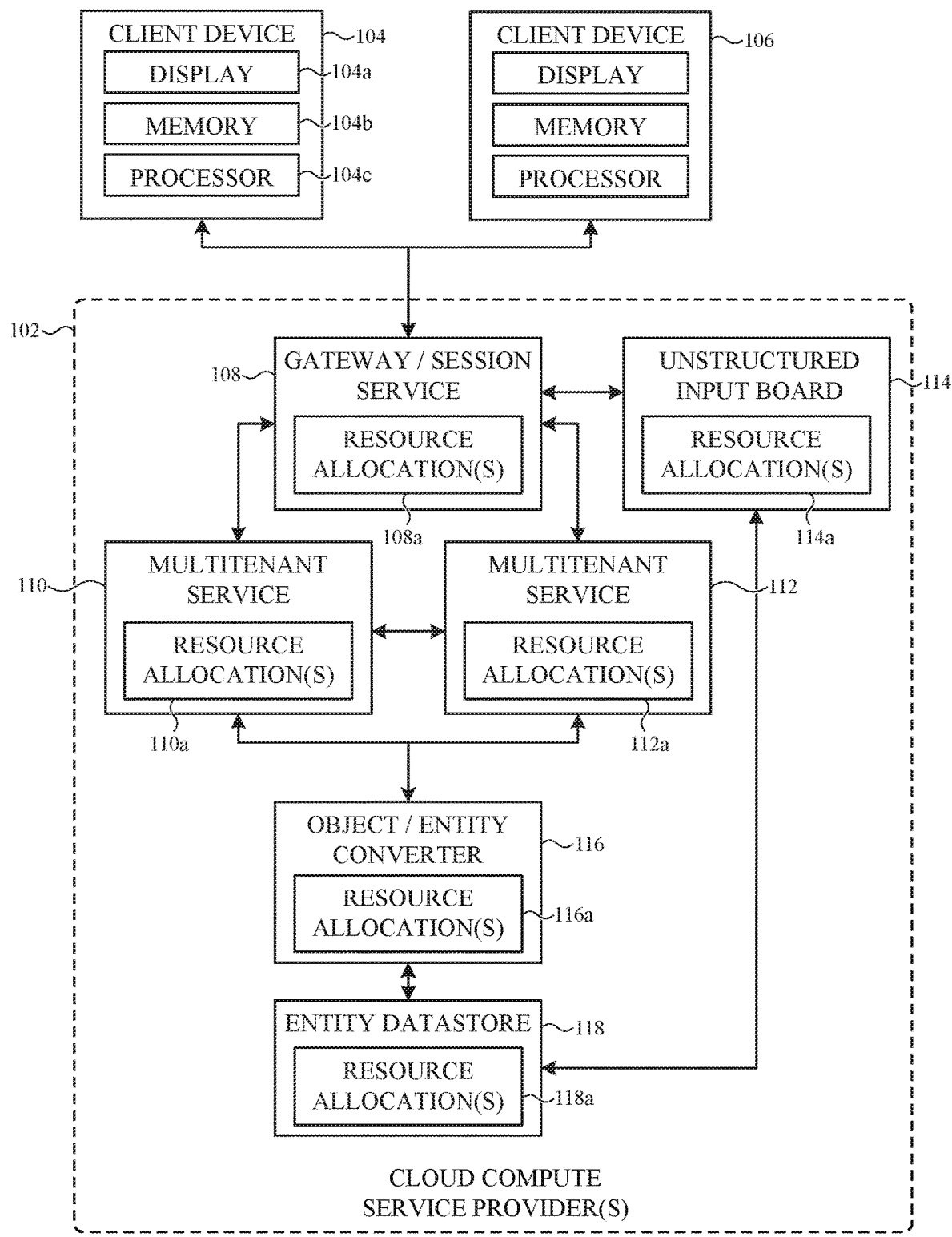
FIG. 1 depicts a simplified system diagram of a multiplatform computing environment configured to subdivide unstructured user input into platform-specific data objects, such as described herein.

Embodiments described herein relate to systems and methods for storing, formatting, transforming, and retrieving organization-owned data that may be created (and later accessed) when leveraging software as a service (herein a "software service" or "platform").

As used herein, the phrase "organization-owned data" may be used to refer to any and all content, data, metadata, or other information regardless of form or format that is authored, developed, created, or otherwise added by, edited by, (or otherwise provided for the benefit of), a user of a software service. Organization-owned data can include personal data, private data, health information, personally-identifying information, business information, trade secret content, copyrighted content or information, restricted access information, research and development information, classified information, mutually-owned information (e.g., with a third party or government entity), or any other information.

In many examples, although not required, organization-owned data may include information that is classified in some manner, according to some procedure or protocol. In many cases, although not required, organization-owned data may include information or content that is accessible to only particular persons or roles within an organization; authentication and authorization rules may control access to and/or modification of such organization-owned information.

In many cases, organization-owned data may be distributed through many different software tools used by that organization. For example, email data may be stored in a database of an email service, telephone logs or messaging content may be stored in a database of a communication service, documentation may be stored in a documentation database of a document management system, issue/bug report data may be stored in a database of an issue tracking system, project/task information may be stored in a database of a project management system, and so on.

Storing and accessing data in this manner has many disadvantages and risks. For example, each individual platform requires users of that platform to learn and understand how to provide input to that system. In many cases, forms and other rigid data structures may be enforced so that users of a particular platform are forced to provide input to that platform in a platform-specific manner.

For example, an issue tracking system may have a frontend that renders a graphical user interface for users of the issue tracking system. The frontend may include multiple selectable options, the function of which users of the issue tracking system must learn. Further, an organization leveraging an issue tracking system may adopt a policy that requires employees of the organization to update the issue tracking system if and when certain work items are completed. In these cases, employees must learn how to access an issue tracked by the issue tracking system, what inputs/buttons/affordances should be used and in what sequence, and what form and format to provide updates to that issue. This may be a cumbersome task, especially for new users. Furthermore, the issue tracking system may intentionally only provide certain fields into which a user can provide input or may update information. As a result, in some cases, a user may not be able to provide a suitably detailed update to a particular issue given the rigid structuring of input fields provided by the issue tracking system.

In another example, a documentation system may have a frontend that renders a graphical user interface for users of the documentation system. As with previous examples, the frontend of the documentation system may also include multiple selectable options, the function of which users of the documentation system must learn. Further, an organization leveraging a documentation system may adopt a policy that requires employees of the organization to update the documentation system based on project status or changes in a particular group's composition or mission. In these cases, as with preceding examples, employees must learn how to access a document tracked by the documentation system, what inputs/buttons/affordances should be used and in what sequence, and what form and format to provide updates to a selected or particular document. As noted above, this may be a cumbersome task, especially for new users. Furthermore, the documentation system may intentionally only provide certain fields into which a user can provide input or may update information. As a result, as with preceding examples, a user may not be able to provide or add a suitably detailed information to a particular document, given the rigid structuring of input fields provided by the documentation system.

The foregoing examples are not exhaustive; a person of skill in the art may readily appreciate that generally and broadly software platforms typically store data in a platform-specific manner and, as a result, collect input from users in a rigid and structured manner. As a result of such structuring and rigidity, users incur substantial productivity and time losses when switching from one platform to another and may become generally frustrated and/or disheartened when facing a regular task of accessing deep menu options provide updates to platform-specific data objects of particular platforms.

These foregoing problems may be particularly frustrating when groups of employees engage in a free-form brainstorming session. More generally, multiplatform systems may be difficult to fully leverage in the context of a meeting, which in turn may result in some shared ideas or insights not being properly captured, which leads to a loss of useful business information.

For example, teams of employees may use one or more third-party or first-party meeting tools, such as a videoconferencing platform or a whiteboarding platform, to facilitate collaborative meetings. Often, at least one attendee of a meeting is tasked with collecting meeting nodes, memorializing discussion, and generating input to one or more collaboration tools used by the team. In many cases, however, attendees tasked with notetaking are unable to participate in the meeting a meaningful manner while also capturing comprehensive notes. Further, especially for larger meetings or collaborations with larger teams, at least some information associated with, or generated in, the meeting may be lost; note-taker(s) may not memorialize all information in each appropriate platform, and/or may be delayed in providing input to each platform, which in turn can result in loss of detail, context, or other important information that might otherwise have been obvious during the meeting itself.

Further still, in some cases, follow-on meetings may benefit from referencing old meeting notes. In some cases, notes may only reflect what occurred at the meeting and may need to be manually updated to include information generated between meetings.

In view of the foregoing, generally and broadly, it may be appreciated that conventional multiplatform computing systems present challenges for data capture tasks, especially in the context of multi-person meetings and brainstorming sessions.

To account for these and other problems, embodiments described herein include a platform-agnostic data input system configured to receive user input any number of users, substantially simultaneously, regardless of form or format.

Users of a platform-agnostic data input system can be presented with a synchronized user interface (which may be referred to herein as a "multiuser input board" a "canvas" or a "whiteboard" element) element that renders content and changes to that content in the same manner for multiple users viewing the platform-agnostic data input system from different frontends (e.g., from different client devices).

In other words, teams of individuals can each access the same multiuser input board (which may be identified by a session identifier or a board identifier), from different end-user devices, and can add content to that multiuser input board in any suitable form or format. In this manner, a multiuser input board and/or a platform-agnostic data input system as described herein can function at least in part as a collaborative whiteboarding application or service.

For example, a team of multiple persons can each leverage personal electronic devices to access a backend of the platform-agnostic data input system which, in turn, can cause a common, synchronized user interface to be rendered at each respective team member's frontend. If a first user makes a change to the user interface, that change can be propagated by the platform-agnostic data input system the each other user so that all changes made by all users can be viewed in substantially real time.

A person of skill in the art may readily appreciated that a number of suitable architectures can effect synchronized user interfaces across multiple users. In some cases, an event-drive architecture may be used in which the platform-agnostic data input system includes an event queue configured to receive user interface events from each individual user and, in response to receiving a user interface event, can transmit messages to each respective user interface to update in a particular manner.

In other cases, a platform-agnostic data input system can maintain a WebSocket with each individual user accessing a particular multiuser input board. In these examples, user interface updates can be broadcast via each respective WebSocket to each end user.

In yet other cases, frontend applications can be configured to manually or automatically refresh user interface content from the platform-agnostic data input system by leveraging a request-response architecture.

In yet other examples, a hybrid architecture can be implemented in which an event-drive architecture publishes user interface events to end user frontends, which in turn can request updated user interface data from the platform-agnostic data input system.

These foregoing examples are not exhaustive; it may be appreciated by a person of skill in the art that any suitable number of architectures can be used to implement a whiteboarding user interface that is time-synchronized across multiple users. As such, for simplicity of description, the embodiments that follow reference an event-driven architecture in which user inputs trigger events that are received by the platform-agnostic data input system that, in response, broadcasts one or more instructions to each user interface to update its content.

Further, it may be appreciated that a platform-agnostic data input system as described herein can maintain any suitable number of multiuser input boards. For example, a team of developers may use the same multiuser input board over the course of a project to share notes, to collect documents, and so on. In another example, a team may use a new multiuser input board every time the team schedules a meeting. As such, generally and broadly, it may be appreciated that a multiuser input board—as a collaboration tool—can be used for a number of purposes and a number of ways to collect free-form user input (e.g., text input, drawing/sketching input, whiteboarding input, multimedia copy-paste, document storage, audio recording, video recording, and so on).

In many cases, a multiuser input board can be described as or otherwise defined by a file stored in a datastore of the platform-agnostic data input system. In some cases, the platform-agnostic data input system can identify each individual multiuser input board by an identifier and/or by a session id.

Embodiments described herein can define a coordinate system for each multiuser input board such that each object rendered therein can be presented in a consistent manner on each frontend.

The coordinate system can also be used to define a graph, the nodes of which each represent a respective one entity or data object added to the multiuser input board (and rendered as graphical user interface elements) by one or more users. The graph, also referred to as an object graph, can be defined by positional relationships between objects; if two objects rendered in the multiuser input board are positioned nearby one another, those objects can be connected by an edge in the object graph.

The object graph may be defined by (and/or constructed according to) one or more thresholds. In particular, nodes may be connected by an edge only if a distance separating the corresponding objects in the multiuser input board are within a threshold distance of one another (as defined by the coordinate system). In this manner, the object graph—which may be constantly updated as elements and data objects are added, removed, and repositioned by one or more users of the platform-agnostic data input system—represents a logical representation of the physical structure of data added to the multiuser input board as defined by users of that particular multiuser input board.

More specifically, a team of developers may use a multiuser input board as described herein to whiteboard and brainstorm how a new feature to a particular software product may be implemented. In one section of the multiuser input board, the team may collect links to competing products and descriptions of similar features. In another section of the multiuser input board, separated from the first section, the team may type a list of deliverables predicted to be necessary to develop the new feature. In yet another section of the multiuser input board, separated from each of the other sections, the team may paste screenshots of current user feedback, requesting the feature to be added.

In this example, the manner in which the team organized the data has fundamental structure that can be automatically detected by the platform-agnostic data input system. In particular, as the team adds data to each one of the above-described sections, the object graph may be updated.

In these examples, the object graph may be constructed by iteratively determining, for each element rendered in the multiuser input board, nearest neighbor elements. For examples, a first element can be used to define a data object such as:

```
{
    node : 1,
    coordinates : [100px, 150px],
    neighbors : {
        nearest_left : 2,
        nearest_right: 7,
        nearest_above : 11,
        nearest_below: 4,
    }
}
```

A second element, nearby the first element, can be used to define a second data object, such as:

```
{
    node : 4,
    coordinates : [90px, 100px],
    neighbors : {
        nearest_left : null,
        nearest_right: null,
        nearest_above : 1,
        nearest_below: 54,
    }
}
```

Based on the coordinates of node 1 and node 4, the platform-agnostic data input system may determine that UI elements that correspond to node 1 and node 4 are separated by approximately 51px, which may satisfy a threshold such that the platform-agnostic data input system defines an edge in the object graph connecting node 1 and node 4.

If the UI element corresponding to node 4 is moved to [510px, 2600px], it may be determined that the UI elements that correspond to node 1 and node 4 are separated by approximately 2484px, which may no longer satisfy the threshold. In this example, after the UI element corresponding to node 4 is moved, any edges in the object graph associating node 1 and node 4 may be removed.

It may be appreciated that thresholds which determine whether a node should be linked by an edge to another node vary from embodiment to embodiment; in some cases, different groups and/or branches of an object graph can be grouped based on different thresholds. For example, in some embodiments a threshold may be 100px, in other cases it may be 1000px or more. In other cases, other coordinate systems and/or units may inform a particular threshold. Any suitable threshold may be used.

In this manner, as new UI elements are added, removed, or repositioned in a particular multiuser input board, the object graph may be updated.

Embodiments described herein leverage the object graph, in real time, to infer structure from the unstructured input provided by users of a particular multiuser input board. For example, the platform-agnostic data input system can subdivide the object graph into distinct branches that include at least a threshold number of elements. For each branch, the platform-agnostic data input system can analyze the structure of the branch to determine whether a recognizable pattern can be extracted. The platform-agnostic data input system can associate particular patterns of free-form, platform-agnostic input provided to a multiuser input board with particular platforms of a collaborative, multiplatform computing environment.

For example, a multiuser input board may be used by a team to write a list of tasks as discrete lines of text in the multiuser input board. The object graph of this multiuser input board may include a branch with nodes corresponding to each line of text. These nodes may have nearest neighbors above and below (relative to the coordinate system of the multiuser input board), but may not have nearest neighbors to the right or left. As a result, the platform-agnostic data input system may determine that the structure of the user input associated with the identified branch of the object graph is a vertically-oriented list of text. Based on this determination, the platform-agnostic data input system may determine that a project management system is the most appropriate internal platform in which to store—or suggest to store—the content of the text list added to that section of the multiuser input board.

In another section of the same multiuser input board, separated by some distance the team may write a calendar of events in a timeline format. In turn, the object graph of this multiuser input board may include a branch with nodes corresponding to UI elements and/or sketches or handwritten notes (that may be OCR'd) oriented in a horizontal timeline. These nodes may have nearest neighbors to the right and left (relative to the coordinate system of the multiuser input board), but may not have a significant number of nearest neighbors above or below. As a result, the platform-agnostic data input system may determine that the structure of the user input associated with the identified branch of the object graph is a horizontally-oriented list of events. Based on this determination, the platform-agnostic data input system may determine that a calendaring or scheduling system is the most appropriate internal platform in which to store—or suggest to store—the content added to that section of the multiuser input board.

In another section of the same multiuser input board, separated by some distance, the team may write pseudocode. The object graph of this multiuser input board may include a branch with a single node corresponding to a UI element that contains a high amount of structural punctuation. This node may not have any nearest neighbors; the branch may contain only a single node. As a result, the platform-agnostic data input system may determine that the structure of the user input associated drafting pseudocode. Based on this determination, the platform-agnostic data input system may determine that a documentation system is the most appropriate internal platform in which to store—or suggest to store—the content added to that section of the multiuser input board.

In other embodiments, an object graph may be optional. For example, in some cases, a multiuser input board can include a feature that can be leveraged by users of the multiuser input board to draw or otherwise define boundaries around particular groupings of elements. Once a user-defined grouping of elements is defined, the multiuser input board and/or an associated platform-agnostic data input system can be configured to leverage semantic analysis and/or machine vision algorithms to infer positional, structural, or hierarchical relationships between different elements. For example, a vertically-oriented listing of text positioned adjacent to another vertically-oriented listing of text can be associated with different boards of a Kanban task management application or service. In other cases, a paragraph of text containing a threshold number of terms associated with project management or project planning may be associated with a project management application. In other cases, text related to dates or times may be associated with a calendaring application, a meeting application, and/or a project management application.

In further examples, machine learning may be leveraged to track how multiuser input boards are used within an organization and, additionally, how other tools are used within the organization. For example, a machine learning system can monitor user inputs provided to one or more multiuser input boards and, thereafter, track and recognize similarly-phrased or similarly-structured content added to one or more applications/services used by an organization. For example, a machine learning system associated with a platform-agnostic data input system as described herein may be configured to note what users provided what input to a particular multiuser input board. Thereafter, the same system may monitor data input to other systems by those same users. Phrased in a simpler manner, a machine learning system associated with a platform-agnostic data input system may be configured to monitor user input to a multiuser input board during a brainstorm meeting and may, for a period of time, monitor inputs to other systems provided by those same users to determine semantic similarity between subsequent user inputs and user inputs provided to the multiuser input board. Over time, such associations between actions taken in a multiuser input board and subsequent inputs provided to other tools can inform operations of the platform-agnostic data input system.

For example, a first user and a second user can collaboration by providing simultaneous input to a multiuser input board. In this example, the first user may begin by typing a list of tasks for the first and second user to perform. The tasks may reference a particular project or task associated with a particular project, and may node a deadline. The second user may begin by copying screenshots of an item of interest into the multiuser input board, thereafter providing hand-written annotations thereto. At a later time, the first user may endeavor to capture the content added by the first user into a separate project management application. For example, the user may add new task to the particular project, and set a deadline for that task based on the deadline agreed to in the meeting in which the first user was collaborating with the second user. The second user may collect notes and may convert handwritten notes to text, and insert those nodes into a documentation system page associated with the project tracked by the project management application.

In this example, a machine learning system associated with the platform-agnostic data input system can determine that the input provided to the multiuser input board by the first user exhibits strong semantic similarity with the input provided by that same user (and/or the second user) to the project management application. In addition, the system may determine that the input provided by the first user has strong semantic similarity to the project itself. In addition, the system may determine, for example by leveraging optical character recognition, that the inputs provided by the second user to the board exhibit significant similarity to the inputs provided to the documentation system. In still further cases, the system may be configured to identify objects, logos, text, and/or other features or characteristics of the individual screenshots added to the board by the second user. For example, the system may be configured to recognize that the screenshot originated from a particular software platform maintained by the first user and the second user. Such information/inference can be used to identify the project tracked by the project management system, into which the first user's input should be added.

In this manner, semantic similarity (as one example of textual analysis and/or natural language processing, machine learning, machine vision, and other similar algorithms and systems), and/or other analysis of text, written, multimedia content, or any other content can be used to identify particular data entities of particular platforms managed by an organization. As such, a system as described herein can not only identify a particular platform based on content input to a multiuser input board, but can also identify where and/or how to input what data to those identified systems.

For example, a team of software developers can maintain an email program. The team may leverage a multiuser input board during a meeting scheduled to discuss how to add single sign-on support to the email program. During the meeting, a first team member may write a pros/cons list in text in a first region of the board. A second team member may write a list of dependencies needed to implement the single sign-on feature. While the second team member writes the list, a third team member may format the list to include a header or bullet points. A fourth team member may begin by hand-drawing a Gantt chart predicting certain deadlines and interdependent tasks.

In this example, when in a learning mode, a machine learning system associated with the platform-agnostic data input system can monitor subsequent inputs of each user to each of a project management application, an issue tracking system, a documentation application, a calendar application, and the like.

Alternatively, when in a prediction mode, the machine learning system associated with the platform-agnostic data input system may access a directory system to determine permissions and entitles common to each user that provided input to the board. In particular, the system may generate a query to the directory system, which can return a list of platforms and/or a list of objects or entities stored by those platforms common to all or at least a majority of the users identified in the query. In this example, the query result may inform the system that all users have access to EMAIL PROJECT, a data entity stored by a project management system, EMAIL.APP, a code repository stored by a repository system, EMAIL DOCUMENTATION, a page stored by a documentation system, and so on.

Thereafter, based on semantic analysis of the input provided by the first user, the system may determine that the first user's content can be added to the EMAIL DOCUMENTATION page of the documentation system. The system may automatically add such content from the board or, in some examples, may provide a suggestion in the board (to either just the first user, a subset of the users, just a manager, or all users) to add that content to the EMAIL DOCUMENTATION page of the documentation system. In some cases, the system may also suggest a particular format (e.g., table format) for the data to take.

Similarly, the system may determine that the Gantt chart drawn by the fourth team member can be converted into a set or series of tasks to be input to a new task or subproject of the EMAIL PROJECT in the project management system. In other cases, the system may provide a suggestion to incorporate this data into either or both the issue tracking system or the project management system. In some cases, the system may also suggest a task management application, such as a Kanban board application.

A person of skill in the art may readily appreciated that the foregoing simple examples are not exhaustive. A system as described herein can be used to identify patterns in structure of an object graph that describes layout of UI elements in a multiuser input board using any suitable technique. In some cases, semantic content may also be analyzed to inform a determination of a particular platform to suggest as relevant to particular groups of content (e.g., branches of an object graph) present in the same multiuser input board.

Any suitable pattern recognition may be used. In some cases, a directionality metric of the object graph (or a branch thereof) may be used to inform selection of a platform associated with the pattern. In other cases, other properties (either directed or derived) may be used to inform the selection of a platform associated with the pattern.

In other cases, metadata and/or content associated with UI elements added to a multiuser input board can be leveraged, with the associated branch or object graph. For example, the object graph can determine that objects are vertically-oriented, and semantic analysis can be leveraged to determine that the term "task" is used. Together (e.g., leveraging Bayesian analysis) these two data can be combined to determine that an appropriate platform may be a task or project management system. In other cases, a vertically-oriented list of text that includes multiple phone numbers or @mentions of attendees of a meeting or members of a team may be determine that a contact management system is an appropriate associated platform.

These foregoing embodiments are not exhaustive of the methods by which an object graph, together with content added to a multiuser input board, can be grouped together and logically associated with a particular platform selected from a set of platforms. In some cases in which a confident suggestion of an associated platform cannot be made, a platform-agnostic data input system may request input from one or more end users, for example by rendering a graphical user interface element asking whether a particular positional group of elements should be associated with a particular platform or more than one platform. Over time, classification of unique patterns of information, both positional and content-based, can be used to train a machine learning and/or other artificial intelligence system such that the system may be leveraged in future applications to identify similar patterns and make similar suggestions of particular platforms.

In further embodiments, a user that adds a particular item to a multiuser input board can inform classification and/or grouping of a particular set of objects added to the multiuser input board. For example, if a user with a role of team lead or lead developer adds an object that includes the word "assignments" the system may determine that proximally located content should be associated with a task tracking application. In other cases, if a user with a role of instructor adds an object that includes the word "assignments," the system may determine that proximally located content should be associated with a documentation system, a curriculum management application, or other application.

In addition to the foregoing example embodiments in which information input to a multiuser input board by multiple users can be grouped and, thereafter, each group associated with a predicted associated platform, further embodiments described herein are configured to automatically convert data extracted from a multiuser input board into platform-specific objects. These platform specific objects can thereafter be synchronized with internal datastores of specific platforms.

For example, as noted above, a vertically-oriented list of text that includes a word such as "task" may be predicted to be associated with a project management application. In certain embodiments, a newline character can be used as a delimiter to separate the list of text into discrete text items, which may be interpreted by the platform-agnostic data input system as individual tasks associated with a particular project. After such a determination is made, the platform-agnostic data input system can communicate with the project management application to create an arbitrary number of tasks, each created task having its content based on a single line of the vertically-oriented list of text.

On the same multiuser input board as the preceding example, a horizontally-oriented grouping of objects that includes a word such as "timeline" may be predicted to be associated with a scheduling application. In certain embodiments, text content of each individual user interface element of the group may be interpreted by the platform-agnostic data input system as individual calendar events associated with a particular schedule. After such a determination is made, the platform-agnostic data input system can communicate with the scheduling application to create an arbitrary number of calendar events, each having a due date and/or duration or title based on text content of the timeline object.

These foregoing example embodiments are not exhaustive; the embodiments described herein, generally and broadly, generate a common user interface referred to as a multiuser input board that can be leveraged by multiple users to add arbitrary content. Once such content is added, an object graph can be created that classifies a shape and/or directionality of different groupings of content added to the multiuser input board. Based on the groupings (which may be branches of the object graph), the system can infer platforms that may be related to that content.

In still further embodiments, the system may be configured to either suggest importing content of a detected group into a selected platform or, in some cases, the system may automatically create platform-specific objects from data extracted from the multiuser input board. As a result of architectures described herein, teams can freely collaborate, adding and organizing information together in any manner that suits the team, and systems described herein can adaptively parse and intelligently segment/fragment that data into platform-specific objects that, in turn, can be automatically communicated to specific platforms so that team and business information is comprehensively captured.

Embodiments described herein may be particularly useful to an organization self-hosting, or providing its employees with access to, a number of different platforms and/or software services to establish a collaborative, cooperative and efficient work environment. Herein, such software services can be referred to as "collaboration tools" or "collaboration services."

Example collaboration services such as described herein can include but may not be limited to: messaging services; telecommunication services; videoconferencing services; issue tracking services; repository services; documentation services; document management systems; knowledge sharing systems; project management services; enterprise resource planning services; supply chain management services; and so on.

Any content added to any of these services, including input(s) provided to customize a particular instance (or tenant experience) of a particular collaboration service, can be considered organization-owned content or data that can be detected and subdivided from a multiuser input board rendered by a platform-agnostic data input system, as described herein.

In addition, communications can flow from platforms to an particular multiuser input board, either as suggestions or for any other suitable purpose. For example, a team leveraging a multiuser input board as described herein may add content detected by the platform-agnostic data input system as relating to a project management system. Thereafter, as described above, one or more project management data objects, stored by the project management system, can be created by the platform-agnostic data input system and transmitted to the project management system. These new data objects can be based on the input provided to the multiuser input board. In addition, in some embodiments, the project management system may be configured to inform the platform-agnostic data input system that data similar to—or substantially similar to (e.g., cosine distance, Levenshtein distance, vector similarity, or any other comparison technique)—content already existing in the project management system. In response, the platform-agnostic data input system can request from a user (or more than one user) of the multiuser input board whether to hydrate information in the multiuser input board with information extracted from the project management system.

For example, the team may provide input to a multiuser input board that is detected as a task list referencing a particular project tracked by the project management system (e.g., referenced by name, referenced by identifier, or any other suitable manner). In response, the platform-agnostic data input system and the project management system can identify one or more existing objects stored by the project management system that relate to and/or already include data or information related to the tasks added to the multiuser input board.

For example, a task added to the multiuser input board may include the text "Assign task 123." By cooperation of the platform-agnostic data input system and the project management system, it may be determined that a task with ID 123 has already been assigned. Upon such a determination, the platform-agnostic data input system can cause the multiuser input board to render a visual indication in the multiuser input board (for all users or a subset of users, such as only managers or only users permitted or authorized to assign tasks in the project management system) noting that task has already been assigned. In some cases, the platform-agnostic data input system may be further configured to modify the multiuser input board to indicate that the task has already been assigned, such as by striking out the line of text "assign task 123."

In other cases, a multiuser input board may be hydrated with information from one or more platforms in other ways. Examples include, but are not limited to: automatically or suggesting to add platform-specific links to content in the multiuser input board detected relevant; automatically or suggesting to add documentation from a documentation service to the multiuser input board; adding or sugging to add links or copies of documents from a file storage service to the multiuser input board; and so on. These examples are not exhaustive, any suitable information can flow from one or more platforms to one or more portions of a multiuser input board as described herein. In some cases, different information may be displayed to different users of a multiuser input board based on user permissions specific to particular platforms. For example, managers may be shown different levels of hydrated content than junior members of a team or organization.

Further still, content in a multiuser input board can be used to perform tasks with one or more platforms, in addition to or in place of adding content to such systems. Examples include, but are not limited to: automatically or suggesting to schedule follow-up meetings in a scheduling application; automatically or suggesting to create and assign tasks to users in a task management application; automatically or suggesting to update documentation pages in a documentation service; automatically or suggesting to add or update a section to a documentation page in a documentation service; automatically or suggesting to invite additional users to edit the multiuser input board; automatically or suggesting to modify one or more user permissions or authorizations in a directory service and so on.

These preceding examples are not exhaustive; it may be appreciated that any suitable task or suggestion based on a platform or collaboration tool associated with a set of platforms in a multiplatform environment can be provided to one or more users of a multiuser input board, such as described herein.

One example of a collaboration service/software service, as described herein, is a project management system or tool that can be implemented in whole or in part as an instance (or tenant of an instance) of software executed by a container, a virtual server, or a physical server (or other computing appliance or combination of appliances) that provides a team of individuals with a means for communicating and exchanging information with one another. All information exchanged through and/or added to a project management system or tool can be considered organization-owned data that may be detected and extracted from a multiuser input board of a platform-agnostic data input system, as described herein.

In some examples, a collaboration service can be configured for use by a software development team to exchange information that can facilitate the completion and assignment of discrete tasks related to software development projects from creation of new user stories (i.e., user-perspective feature requests or desired functionality), through proof of concept testing, through integration testing, through release of software to one or more users, and through reporting and fixing of software errors ("bugs"). Each data item associated with each above-described function can be considered organization-owned data—which can be fractured/subdivided from a multiuser input board of a platform-agnostic data input system—as described herein.

In other cases, a collaboration service can be configured for non-software related purposes, such as for use by a human resources team, an information technology support group, and so on. As with other examples introduced above, any configuration or addition of information to any collaboration service described herein can be considered organization-owned data that can be extracted from a platform-agnostic data input system, as described herein.

In this manner, more generally and broadly, a collaboration service increases efficiency of a team of individuals working on a common goal or project by increasing the speed by which information can be shared between team members, between supervisors and subordinates, and between management and staff and between platforms. Further still, embodiments described herein increases efficiency of a multiplatform system by increasing the speed and convenience with which information is added to and aggregated from and between platforms.

To perform these functions, a collaboration service, however configured or used by a team of individuals or an organization, can implement a client-server architecture in which a host server or service associated with the collaboration service receives requests from and provides responses to (some or all of which may comply with a communication protocol such as HTTP, TCP, UDP, and the like) one or more client devices, each of which may be operated by a user of the collaboration service.

In other cases, a request-response architecture may not be required and other communication and information transaction techniques may be used. For simplicity of description, examples that follow reference a request-response architecture, but it may be appreciated that different collaboration services may be configured to serve and/or host information, including organization-owned data, in a number of suitable ways.

In these examples, more specifically, a host server supporting one or more functions of a collaboration service such as described herein can serve information, including organization-owned data, to a client device and, in response, the client device can render a graphical user interface on a display to present at least a portion of that organization-owned data to a user of that client device.

Software instances executing on the client device configured to render such graphical user interfaces can be referred to as "frontend" portions of a platform, as described herein. Correspondingly, servers and/or remote services configured to communicate with a frontend as described herein can be referred to as "backend" services. In many cases, each platform is associated with a respective frontend and a respective backend which can communicably intercouple in any suitable manner (e.g., request-response, WebSockets, publish/subscribe, or any other suitable communication model).

These foregoing and other embodiments are discussed below with reference to FIGS. 1-5. However, those skilled in the art will readily appreciate that the detailed description given herein with respect to these figures is for explanation only and should not be construed as limiting.

FIG. 1 depicts a simplified system diagram of a multiplatform computing environment configured to subdivide unstructured user input into platform-specific data objects that may be associated with one or more software platforms, such as described herein.

Platforms that may be associated with the multiplatform computing environment 100 can include, but may not be limited to: messaging services; telecommunication services; videoconferencing services; issue tracking services; repository services; documentation services; document management systems; knowledge sharing systems; project management services; enterprise resource planning services; supply chain management services; and so on.

Any content added to any of these services, including input(s) provided to customize a particular instance (or tenant experience) of a particular software platform, including multimedia data such as images, audio files, or videos, can be considered organization-owned, content as described herein.

In the illustrated example, the multiplatform computing environment 100, which is merely one example of an architecture such as described herein, is implemented as a first party or third party cloud service, over virtual or physical hardware accessible at least in part over the open Internet. In some cases, the multiplatform computing environment 100 is implemented within a private network, such as an intranet defined for use by a single organization.

As may be appreciated by a person of skill in the art, a cloud service or network-accessible service can be physically architected in number of suitable ways. In one implementation, a request-response over TCP may be used. In another example, a WebSocket or other full-duplex server-client architecture may be used. In many cases, multiple physical resources may be leveraged to define one or more allocations of virtual resources, such as processor allocations or memory allocations.

It may be appreciated by a person of skill in the art that a processor allocation associated with a multiplatform computing environment, such as the multiplatform computing environment 100, may operate over one or more physical cores of one or more physical processors in one or more locations; regardless of configuration, however, a processor allocation as described herein can be configured to perform any suitable processing task associated with instantiation of, and/or operation of, one or more platforms or services of the multiplatform computing environment 100. Similarly, a memory allocation and/or a networking allocation may be associated with a multiplatform computing environment, such as the multiplatform computing environment 100, as described herein.

For simplicity of description and illustration, the multiplatform computing environment 100 is described herein as implemented/instantiated over a host service 102. The host service 102 communicably couples via one or more networking or wired or wireless communication protocols to two or more client devices, two of which are shown. It may be appreciated that any number of client devices can communicably intercouple with the host service 102 of the multiplatform computing environment 100. In the illustrated embodiment, a client device 104 and a client device 106 are shown.

The client device 104 and the client device 106 can be configured in the same or different ways; for simplicity of description, the embodiments that follow presume that the client device 106 is configured in the same manner as the client device 104, but it may be appreciated that this is merely one example and is not a requirement of all embodiments.

Further, it may be appreciated that other client devices may be configured in a substantially similar manner as the client device 104, although this may not be required of all embodiments and different client devices can be configured differently and/or may transact data or information with, and/or provide input(s) to, the host service 102 in a unique or device-specific manner.

The client device 104 can be any suitable personal or commercial electronic device and may include, without limitation or express requirement, a display 104a, volatile or non-volatile memory (identified, collectively, as the memory 104b), and a processor 104c. Example electronic devices include, but are not limited to: laptop computers; desktop computers; cellular phones; tablet computing devices; and so on. It may be appreciated that a client device 104, such as described herein, can be implemented in any suitable manner.

In many embodiments, the processor 104c of the client device 104 can be configured to execute one or more software applications (each referred to as "client applications") stored, at least in part, in the memory 104b. Each respective client application can be instantiated by the processor 104c. In particular, the processor 104c may access a persistent memory (e.g., of the memory 104b or of a separate memory structure) to retrieve one or more executable binary files and/or other computer-executable instructions (collectively, "assets" or "executable assets").

The processor 104c thereafter can load at least a portion of the retrieved assets into a working memory (e.g., of the memory 104b), thereby at least partially instantiating a respective one instance of a respective one client application. For simplicity of description an implementation in which the client device 104 is configured to execute/instantiate a single client application is described below.

As noted above, in embodiments, the host service 102 is configured to operate within or as a virtual computing environment that is supported by one or more physical servers including one or more hardware resources such as, but not limited to (or requiring) one or more of: a processor; a memory (also referred to as a working memory); non-volatile storage (also referred to as persistent memory); networking connections; and the like.

Specifically, it may be appreciated that although referred to as a singular "server", the host service 102 may be a cluster of different computing resources, which may be geographically separated from one another. In this manner, generally and broadly, both the host service 102 and the client device 104 can be referred to, simply, as "computing resources" that are communicably coupled to one another via a suitable network connection.

As used herein, the term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

As noted above, the host service 102 and the client application supported/executed by the client device 104 are communicably intercoupled via a suitable network connection which may be wired, wireless, or a combination thereof. In some examples, the network connection may include the open Internet.

In other cases, the network connection coupling the host service 102 and the client application may include only a private intranet managed by, or otherwise utilized by, an organization such as referenced above. The host service 102 and the client application can communicate according to any suitable protocol, form, or format. In many examples, the host service 102 at least partially exposes an API that can be accessed by the client application to perform one or more functions. For example, the client application may leverage the API to request organization-owned data (such as described herein) from the host service 102.

For simplicity of description, the embodiments that follow reference a configuration in which the host service 102 and the client application are configured to communicate and transact information according to a RESTful API, but it may be appreciated that this is merely one example and in other embodiments other signaling, communication, or data transaction methodologies may be used.

The host service 102 of the multiplatform computing environment 100 can be configured and/or implemented in a number of suitable ways. For example, as noted above, in many embodiments the host service 102 can leverage physical and/or virtual resources allocated to it to instantiate any suitable number of discrete subservices or purpose-configured modules, containers, virtual or physical networks, or virtual machines each configured to perform, coordinate, host, serve, or otherwise provide one or more services, functions, or operations of the multiplatform computing environment 100.

For example, the host service 102 of the multiplatform computing environment 100 can serve as infrastructure to instantiate a gateway and/or session manager service 108, a first software platform 110 and a second software platform 112, each associated with a respective resource allocation of virtual and/or physical processors, memory, networking, and so on. These resource allocations are identified in the figure as the resource allocations 108a, 110a, and 112a respectively.

The host service 102 can also include a platform-agnostic input system, also referred to as an unstructured input multiuser input board service 114, which may also be associated with a respective resource allocation of virtual and/or physical processors, memory, networking, and so on (e.g., the resource allocation 114a). The host service 102 can also include a platform-specific object converter 116, which may also be associated with a respective resource allocation of virtual and/or physical processors, memory, networking, and so on (e.g., the resource allocation 116a). The host service 102 can also include a platform-agnostic data store 118 (also referred to as an entity datastore, or a multiuser input board datastore), which may also be associated with a respective resource allocation of virtual and/or physical processors, memory, networking, and so on (e.g., the resource allocation 118a).

In this construction, client application(s) executing on the client device 104 can communicably couple, via the gateway service 108 to any one or more of the unstructured input multiuser input board 114, the first software platform 110, or the second software platform 112.

As with other embodiments described herein, in some constructions, a client application executing on the client device 104 can couple to the gateway service 108 which, in turn, can couple the client device to the unstructured input multiuser input board 114. In response, a multiuser input board user interface element can be rendered on the display 104a of the client device 104. The multiuser input board user interface element, as noted above, can be configured to render any suitable graphical user interface elements or set of elements to facilitate free-form user input thereto. In some cases, the multiuser input board user interface element can be configured to facilitate text input, sketch/hand-drawn input, voice recording, image recording, file upload and so on. These examples are not exhaustive; the multiuser input board graphical user interface element can be configured to provide any suitable user interface to facilitate brainstorming or whiteboarding to users of the client device 104 and/or the client device 106.

As with other embodiments described herein, the unstructured input multiuser input board 114 can be configured to maintain synchronization between multiple different users, such as a user of the client device 104 and the client device 106. Any suitable architecture may be leveraged to maintain near real-time synchronization between client devices/client applications. For example, in some embodiments, in response to a user of the client device 104 adding an element to a multiuser input board, the unstructured input multiuser input board 114 can send a notification or alert to the client device 106 to cause the user interface of the client device 106 to update to display the information/data/objects that were added by the user of the client device 104.

The unstructured input multiuser input board 114 can be configured to maintain multiple different multiuser input boards, each of which may be associated with a particular session identifier. In some cases the gateway 108 may be configured to manage sessions with the unstructured input multiuser input board 114 so that a client device that submits a particular session identifier to the gateway 108 may be served with a multiuser input board, retrieved from the platform-agnostic datastore 118 matching that session identifier.

As noted above, the unstructured input multiuser input board 114 and/or a client application rendering a multiuser input board as described herein, can be configured to maintain an object graph and a coordinate system specific to each particular multiuser input board. As elements are added to a multiuser input board, those element can be stored (as a sub-entity of the multiuser input board itself) in the platform-agnostic data store 118. In addition, new or modified elements can be added and/or repositioned in the object graph.

The unstructured input multiuser input board 114 can be configured to regularly monitor the object graph of each multiuser input board. In particular, the unstructured input multiuser input board 114 can be configured to determine groups of elements, which may be defined base on proximity to one another in the coordinate system of a particular multiuser input board. More generally, the unstructured input multiuser input board 114 can be configured to determine contiguous groups of elements that are physically within a threshold distance of one another.

One method of grouping elements may be to maintain the object graph such that edges coupling nodes are based on each nodes' nearest neighbor to a particular direction or angle. In these embodiments, nearest neighbor may be defined as a node closest to another node in a particular direction, and below a maximum/threshold distance. For example, if a threshold is set to define that any elements separated by more than 500px are not neighbors, two elements that are 300px apart (without intervening elements along a particular direction) can be defined as nearest neighbors. Alternatively, if two elements are more than 700px apart, the unstructured input multiuser input board 114 may determine that neither element has a nearest neighbor along that particular direction. In this manner, the object graph—containing nodes that correspond to elements added to a multiuser input board intercoupled by edges linking nearest neighbors (confirming with a selected or variable threshold) along particular or arbitrary directions—may be constructed.

For example, in some cases, four cardinal directions may be used to populate nearest neighbor lists/edge attributes of individual nodes. In other cases, more than four angles may be used. In other cases, nearest neighbors can be defined exclusively by absolute distance defined in a coordinate system (e.g., cartesian, polar, and so on) specific to a particular multiuser input board. In these examples, the object graph may organically grow to adopt a structure that mirrors the physical structure/distribution of elements in a particular multiuser input board. In other words, individual branches of the object graph can be selected as physically-proximate groupings of elements.

Once one or more groups of elements (or branches of the object graph having, in some cases, at least a threshold number of nodes and/or a threshold number of edges) can be provided as input to a pattern matching system or other classifier of the unstructured input multiuser input board 114 which, in turn, may provide as output at least one prediction of a platform that may be associated with the data, node structure, and layout of the multiuser input board or, in particular, of a portion of the multiuser input board. Thereafter, the nodes or multiuser input board elements determined to be relevant to a particular platform can be provided as input to the platform-specific object converter 116, which in turn can construct an object also referred to as a data object, that is specific to the identified platform.

In this manner, unstructured, free-form input provided by one or more users of a multiuser input board rendered a one or more client devices by operation of the unstructured input multiuser input board 114 can be grouped and, in turn, each group of content can be used as input to a classifier to determine whether that content is relevant to a particular platform selected from a set of platforms (e.g., the first software platform 110 or the second software platform 112).

These foregoing embodiments depicted in FIG. 1 and the various alternatives thereof and variations thereto are presented, generally, for purposes of explanation, and to facilitate an understanding of various configurations and constructions of a graph data structure and a platform-agnostic data store, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2A:
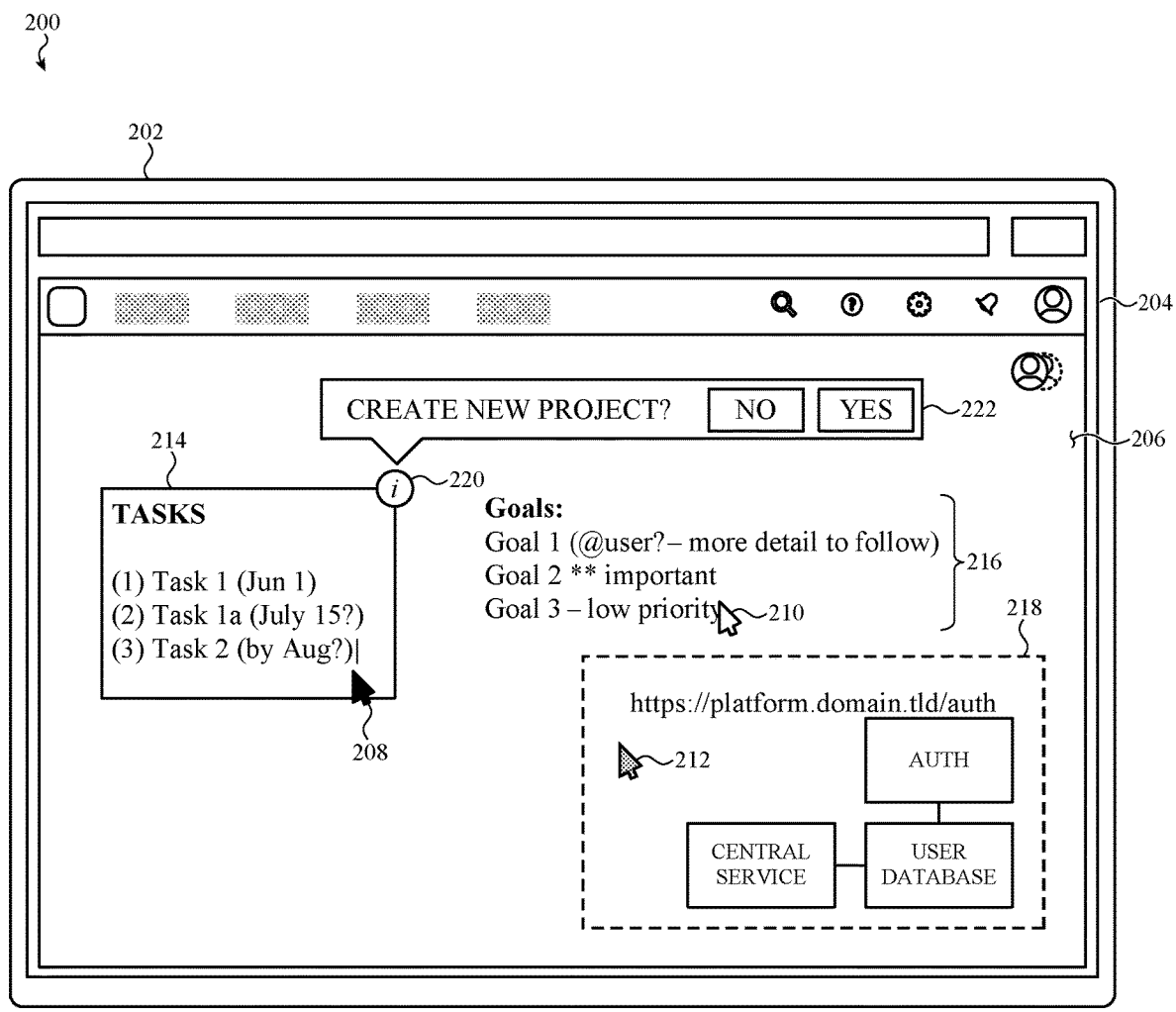
FIGS. 2A-2B depict an example graphical user interface/frontend of a platform-agnostic data input system of a multiplatform computing environment, such as described herein.

FIG. 2A depicts an example graphical user interface/frontend of a platform of a platform-agnostic data input system of a multiplatform computing environment, such as described herein. The platform-agnostic data input system may be configured and/or operated in a similar manner as described above with reference to the unstructured input multiuser input board 114 of FIG. 1; this description is not repeated.

As with other embodiments described herein, the frontend of the platform-agnostic data input system may be configured to render a multiuser input board user interface element which may be identified by a session identifier and/or a multiuser input board identifier.

The frontend can be rendered by a client device 200, which may be configured in the same manner as described above with reference to FIG. 1; this description is not repeated. The client device 200 can include a display 202 configured to be operated by a client application/frontend application in communication with a backend system associated with the platform-agnostic data input system.

As with other architectures, the client application can receive data from the backend system and, in response, render a graphical user interface 204 including a multiuser input board graphical user interface element 206. The multiuser input board graphical user interface element 206 can be configured, presented, and arranged in an implementation-specific manner, a user-specific manner, a localization-specific manner, or in any other suitable way.

For example, content rendered by the graphical user interface 204 may be text content, multimedia content, graphical content, photos, line drawings, video content, animated content, and so on.

The graphical user interface 204 is configured to be synchronously rendered (and/or stream-rendered) across multiple devices/endpoints, such that multiple users can simultaneously provide input to the multiuser input board graphical user interface element 206. In the illustrated embodiment, three separate cursors are shown, indicating cooperative operation by three separate users, each of which may operate their own distinct client device. In particular, the cursors are identified as the user cursor 208, the user cursor 210, and the user cursor 212.

Each user may add different content in different regions of the multiuser input board graphical user interface element 206. For example, a first user operating the user cursor 208 may add a task list 214 in one region of the multiuser input board graphical user interface element 206, a second user operating the user cursor 210 may add or note a set of goals 216 in a separate region from the first region, and a third user operating the user cursor 212 may draw a diagram 218, which may include text, links, drawn content, or any other suitable free-form input.

As each user adds content to the multiuser input board graphical user interface element 206, an object graph may be updated. For example, the object graph may include a set of nodes corresponding to each line of the task list 214, a set of nodes corresponding to each goal of the set of goals 216, and a set of nodes each corresponding to elements of the diagram 218.

The object graph—which may be updated by the client device or a backend server—may node that each of the set of nodes corresponding to the task list 214 have nearest neighbor nodes above and below, but not to the right or to the left. This may be due to a threshold distance separating the task list 214 from the set of goals 216 is not satisfied (e.g., the two elements/regions of the multiuser input board are too far separated to be considered nearest neighbors). Similarly, the nodes associated with the list of goals may have upper and lower nearest neighbors, but not neighbors to the right or left. Similarly, the nodes associated with the diagram 218 may have nearest neighbors in many directions, but may not associate with the set of goals 216 or the task list 214. A person of skill in the art may appreciate that thresholds may be fixed or may vary, or may be varied based on an output of a computer vision system configured to analyze the multiuser input board on the whole; many methods of defining groupings of elements may be used.

In the example embodiment, the object graph may include three distinct branches, one with nodes corresponding to elements of the task list 214, one with nodes corresponding to elements of the set of goals 216, one with nodes corresponding to elements of the diagram 218.

Each of these branches (or otherwise groups of elements, defined in an appropriate manner) can be provided as input to a pattern matching or classification algorithm configured to consume semantic, visual, metadata, and/or structural content and to predict a relevant platform that may be optimal to store the data of that branch. For example, the task list 214 may be determined to be most associated with a project management application. In response to such a determination, the multiuser input board graphical user interface element 206 can be updated with an informational affordance 220 that, when engaged by a user, can request input from the user via a popup 222 as to whether the information in the task list 214 should be leveraged to create a new project (a platform-specific object) in the project management application.

Similarly, the set of goals 216 may be determined to be most associated with an issue tracking application or a Kanban board application. The diagram 218 may be determined to be most associated with a documentation system. These are merely examples; other content may be associated with other platforms and/or more than one platform.

In this manner, unstructured content added to the multiuser input board graphical user interface element 206 can be automatically segmented (into groups/branches of the object graph), and automatically added or suggested to be added to one or more selected platforms.

In yet other examples, the multiuser input board graphical user interface element 206 can be configured to precondition and/or preformat unstructured data into a more organized structured format that, in turn, may be more efficiently transmitted to other platforms as platform-specific data objects.

Figure 2B:
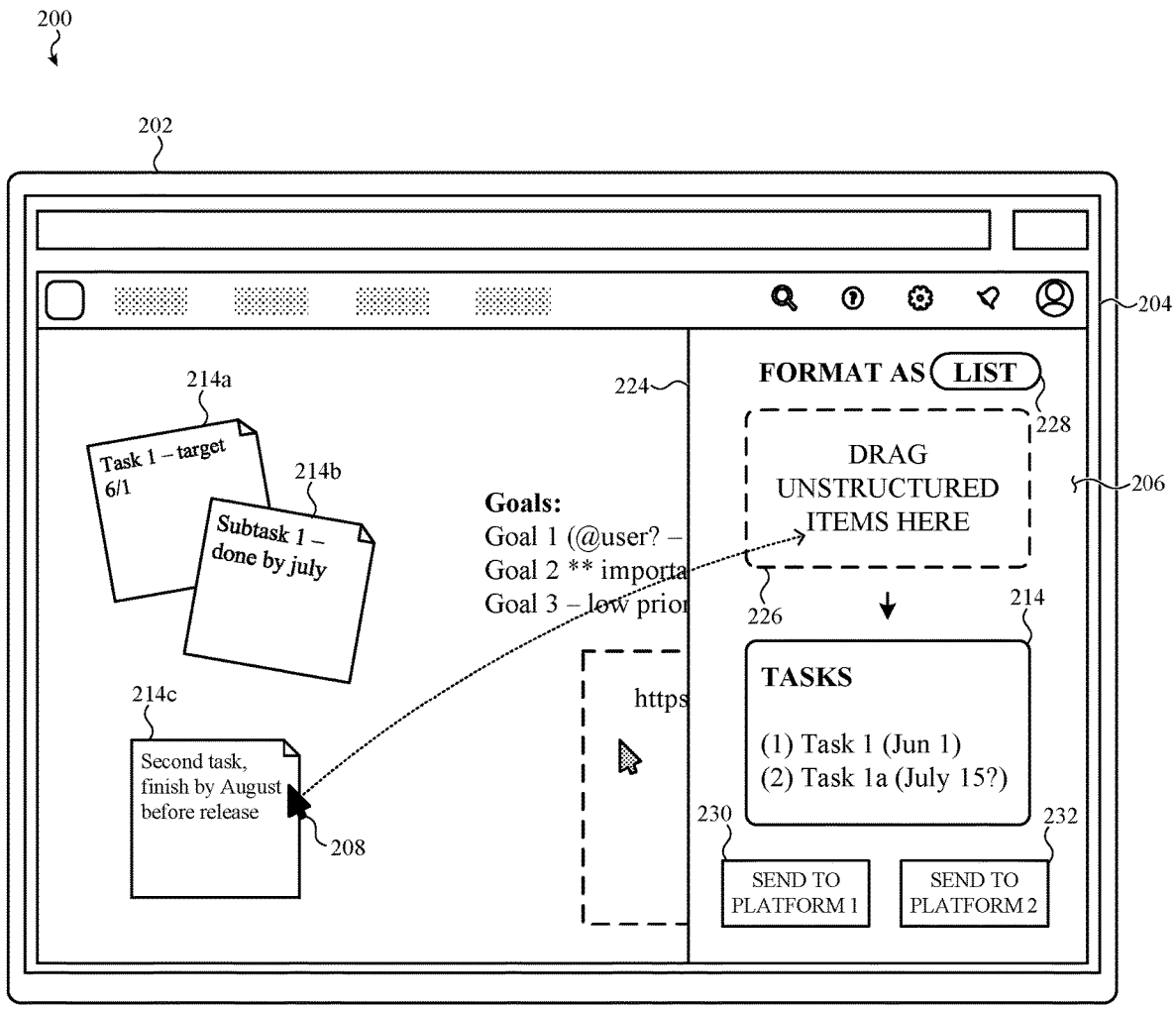

For example, FIG. 2B depicts a variation of the multiuser input board graphical user interface element 206 shown in FIG. 2A, depicting a set of notes 214a-214c that may be added to the multiuser input board graphical user interface element 206 as free-form input. For example, a first note 214a can be positioned at a particular location, and text input can be added thereto. A second mode 214b can be positioned at a different location (which may overlap the first location), and may include different text input or other multimedia input. A third node 214c can be positioned at yet a different location, including yet other text input.

In this example graphical user interface, a drawer element 224 or other slide-over can be rendered to encourage one or more users of the multiuser input board graphical user interface element 206 to formalize or structure the note-based free-form input provided to the multiuser input board graphical user interface element 206. For example, in the illustrated embodiment, the drawer element 224 can encourage a user operating the user cursor 208 to drag one or more of the notes 214a-214c over an input area 226. Based on a user selection provided to an output format mode selector 228, a note dragged into the input area 226 can be formatted in a particular manner, either by the end user device or by a backend system. Once the note is formatted according to the selection provided to the output format mode selector 228, the reformatted content can be appended to the task list 214 which, in turn, can be inserted into the multiuser input board graphical user interface element 206, replacing the notes 214a-214c with a more formal/structured task list element.

In some embodiments, the drawer element 224 can also present an option to the user to automatically add content inserted to the input area 226 into one or more platforms, such as a project management platform or an issue tracking platform. The suggested platforms presented to a user may be based, at least in part, on the content added to the input area 226. By way of example, two suggested platforms are shown in FIG. 2B, providing an option to a user to insert content into either a first platform 230 or a second platform 232. It may be appreciated, however that these are merely examples.

Figure 3:
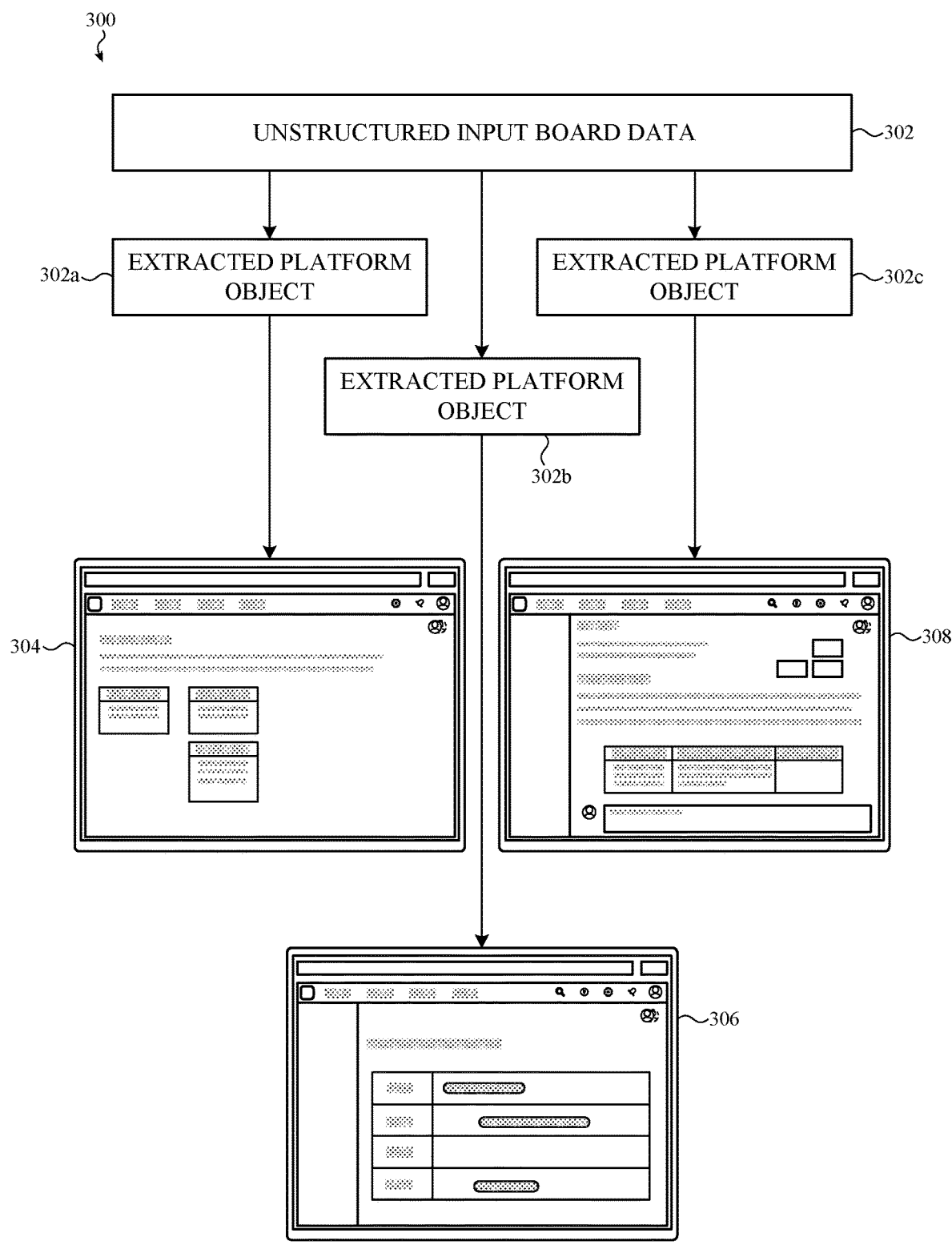
FIG. 3 depicts a signal flow diagram illustrating subdivision of unstructured data into platform-specific data objects.

For example, FIG. 3 depicts an information flow diagram 300 in which data added to a multiuser input board graphical user interface element (collectively, the unstructured input multiuser input board data 302) can be subdivided and from it, multiple platform-specific objects can be extracted. For example, a first platform-specific object 302a extracted from the unstructured input multiuser input board data 302 can be provided to the platform 304, a second platform-specific object 302b extracted from the unstructured input multiuser input board data 302 can be provided to the platform 306, and a third platform-specific object 302c extracted from the unstructured input multiuser input board data 302 can be provided to the platform 308.

In some examples, information can also flow in the opposite direction; updates to platform-specific objects in particular platforms can be used to update associated user interface elements in a multiuser input board graphical user interface element.

These foregoing embodiments depicted in FIGS. 2-3 and the various alternatives thereof and variations thereto are presented, generally, for purposes of explanation, and to facilitate an understanding of various configurations and constructions of a platform-agnostic input system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4:
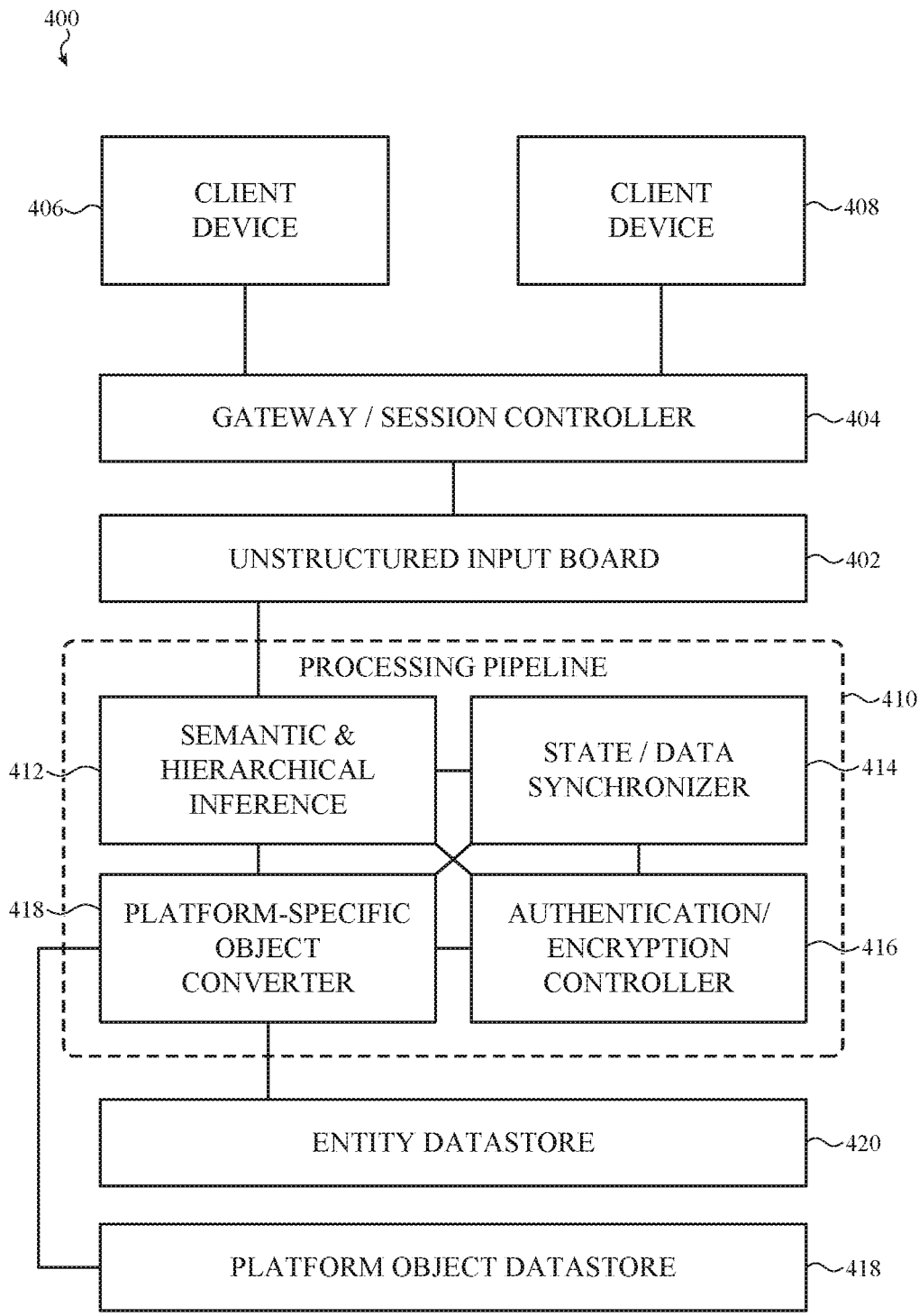
FIG. 4 depicts a system diagram of a system as described herein.

For example, in some embodiments, an architecture as described herein can also include one or more data processing pipelines that can be leveraged by the platform-agnostic input system and/or a client device or client application to perform or coordinate at least one operation of a platform-agnostic input system as described herein. FIG. 4 depicts a simplified system diagram of a system as described herein.

FIG. 4 depicts a system 400, as described herein. The system 400 includes an unstructured input multiuser input board rendering system 402 that can receive user inputs, via a optional gateway service (the gateway 404) from one or more client devices, such as the client device 406 and the client device 408.

In response to receiving inputs to a multiuser input board user interface element rendered in a graphical user interface of each of the client device 406 and the client device 408, the unstructured input multiuser input board rendering system 402 may provide multiuser input board data (e.g., such as a listing of objects) to a processing pipeline 410.

The processing pipeline 410 can include a semantic and hierarchical inference controller 412 configured to generate an object graph and to determine/predict one or more appropriate platforms associated with particular groupings of elements added to the multiuser input board. The semantic and hierarchical inference controller 412 can be communicably intercoupled with a state synchronizer 414 configured to synchronize platform-specific objects and known associated multiuser input board objects. In addition, the semantic and hierarchical inference controller 412 can be communicably intercoupled with an authentication and/or encryption controller 416 configured to manage permissions for a multiuser input board based on permissions of individual platforms or platform data referenced by and/or otherwise associated with one or more objects added to a multiuser input board as described herein. In addition, the semantic and hierarchical inference controller 412 can be communicably intercoupled with a platform-specific object converter 418 configured to convert data objects extracted from a multiuser input board into platform-specific objects, which can be stored by individual platforms, such as in a platform-specific object datastore 418.

Data from the processing pipeline 410 and/or data obtained by the unstructured input multiuser input board rendering system 402 can be stored in a datastore 420.

These foregoing embodiments depicted in FIG. 4 and the various alternatives thereof and variations thereto are presented, generally, for purposes of explanation, and to facilitate an understanding of various configurations and constructions of an example system architecture, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 5:
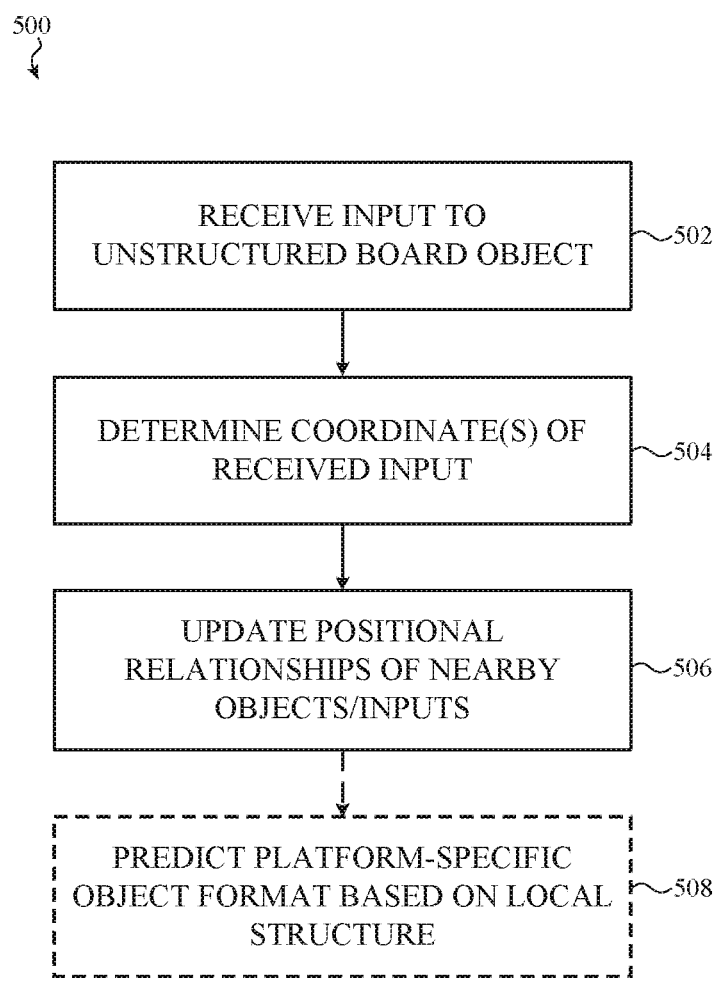
FIG. 5 is a flowchart depicting example operations of a method of subdividing platform-agnostic data into platform-specific data objects, as described herein.

FIG. 5 is a flowchart depicting example operations of a method of subdividing platform-agnostic data into platform-specific data objects, as described herein. The method 500 includes operation 502 at which input is received to a multiuser input board, as described herein. In response, a position of new elements may be determined at operation 504 based on a coordinate system of the multiuser input board. Next, at operation 506, an object graph can be updated based on the determined position of new elements added to the multiuser input board. Finally, at operation 508, which may be optional, a platform associated with the new element and other elements local to that element may be determined/predicted.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

Further, many foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A server system for providing a whiteboarding platform, the server system comprising:
 a network-accessible cloud service infrastructure comprising one or more processor allocations and one or more memory allocations configured to instantiate a host service, the host service executing a backend application instance configured to provide server-side functionality of a multi-user whiteboarding session between the backend application instance and a set of client devices, each client device of the set of client devices operating a respective frontend application instance, the backend application instance configured to:
 generate a first whiteboard element on a virtual canvas in response to a first user input received at a first client device of the set of client devices and cause display of the first whiteboard element in at least a subset of respective frontend application instances;
 generate a second whiteboard element on the virtual canvas in response to a second user input received at a second client device of the set of client devices and cause display of the second whiteboard element in the at least the subset of respective frontend application instances;
 in response to receiving an external object creation command, identify a set of whiteboard elements positioned on the virtual canvas and within a maximum threshold distance each other;
 analyze the set of whiteboard elements to determine a first information;

using the first information, cause creation of an instance of an issue object in an issue tracking platform based on the set of whiteboard elements; and subsequent to creating the issue object in the issue tracking platform:
extract a second information from the issue object; and
modify one or more whiteboard elements of the set of whiteboard elements to include the second information extracted from the issue object; and
cause display of the modified one or more whiteboard elements on the virtual canvas.

2. The server system for providing a whiteboarding platform of claim 1, wherein:
the one or more whiteboard elements includes an identifier;
prior to causing creation of the issue object, a query is submitted to the issue tracking platform using the identifier;
in response to the query returning an existing issue corresponding to the identifier, third information is extracted from the existing issue; and
the one or more whiteboard elements are modified to include the third information extracted from the existing issue object.

3. The server system for providing a whiteboarding platform of claim 1, wherein:
subsequent to creating the issue object on the issue tracking platform, the one or more whiteboard elements are modified to include a selectable link; and
in response to a user input provided to the selectable link, a current graphical user interface is redirected to a graphical user interface of the issue tracking platform.

4. The server system for providing a whiteboarding platform of claim 1, wherein in response to receiving the external object creation command:
the set of whiteboard elements are analyzed to identify a set of tasks; and
the whiteboarding platform causes creation of a set of issue objects, each object corresponding to a task of the set of tasks.

5. The server system for providing a whiteboarding platform of claim 4, wherein in response to a completion of a respective issue object of the set of issue objects, a respective whiteboard element is modified to visually indicate the completion of the respective issue object.

6. The server system for providing a whiteboarding platform of claim 1, wherein modifying the one or more whiteboard elements to include the second information includes replacing the one or more whiteboard elements with a structured task list element.

7. The server system for providing a whiteboarding platform of claim 1, wherein the backend application instance is further configured to:
define an object graph of nodes based on the set of whiteboard elements that are positioned within the maximum threshold distance of each other, each node of the object graph corresponding to a respective whiteboard element and related to other nodes of the object graph by a respective edge; and
determine the first information using the object graph.

8. The server system for providing a whiteboarding platform of claim 7, wherein in response to a movement of a particular whiteboard element of the set of whiteboard elements beyond the maximum threshold distance, a particular node corresponding to the particular whiteboard element is removed from the object graph.

9. A method for operating a whiteboarding platform, the method comprising:
at host service executing a backend application instance configured to provide server-side functionality of a multi-user whiteboarding session between the backend application instance and respective frontend application instances, each operating on a respective client device of a set of client devices:
generating a first whiteboard element on a virtual canvas in response to a first user input received at a first client device of the set of client devices and cause display of the first whiteboard element in at least a subset of respective frontend application instances;
generating a second whiteboard element on the virtual canvas in response to a second user input received at a second client device of the set of client devices and cause display of the second whiteboard element in the at least the subset of respective frontend application instances;
causing display of a graphical user interface element on the virtual canvas, the graphical user interface element having an input area;
in response to one or more events including a user input causing the first whiteboard element to be moved into the input area:
analyzing the first whiteboard element to determine a first information;
using the first information, causing creation of an instance of an issue object in an issue tracking platform based on the first whiteboard element; and
subsequent to creating the issue object in the issue tracking platform:
extracting a second information from the issue object; and
modifying the first whiteboard element to include the second information extracted from the issue object; and
causing display of the modified first whiteboard element on the virtual canvas.

10. The method of claim 9, wherein:
the graphical user interface element includes a control; and
subsequent to the user input the first whiteboard element to be moved into the input area and subsequent to a user selection of the control, cause the creation of the instance of the issue object in the issue tracking platform.

11. The method of claim 10, wherein:
the control is a first control;
the graphical user interface element includes a second control; and
subsequent to the user input causing the first whiteboard element to be moved into the input area and subsequent to a user selection of the second control, cause the creation of an instance of an object in a platform different than the issue tracking platform.

12. The method of claim 9, wherein:
the first whiteboard element is a virtual note; and
subsequent to the user input causing the first whiteboard element to be moved into the input area, the virtual note is converted into a task element.

13. The method of claim 9, wherein:
the first whiteboard element includes an identifier;

prior to causing creation of the issue object, a query is submitted to the issue tracking platform using the identifier;

in response to the query returning an existing issue object corresponding to the identifier, third information is extracted from the existing issue object; and the first whiteboard element is modified to include the third information extracted from the existing issue object.

14. The method of claim 9, wherein subsequent to creating the issue object on the issue tracking platform, the first whiteboard element is modified to include a selectable link that links to the issue object on the issue tracking platform.

15. A method for operating a whiteboarding platform, the method comprising:

at host service executing a backend application instance configured to provide server-side functionality of a multi-user whiteboarding session between the backend application instance and respective frontend application instances, each operating on a respective client device of a set of client devices:

generating a first whiteboard element on a virtual canvas in response to a first user input received at a first client device of the set of client devices and cause display of the first whiteboard element in at least a subset of respective frontend application instances;

generating a second whiteboard element on the virtual canvas in response to a second user input received at a second client device of the set of client devices and cause display of the second whiteboard element in the at least the subset of respective frontend application instances;

in response to receiving an external object creation command, identifying one or more whiteboard elements positioned on the virtual canvas and satisfying a positional criterion with respect to each other;

analyzing the one or more whiteboard elements to determine a first information;

using the first information, causing creation of a instance of an issue object in an issue tracking platform; and subsequent to creating the issue object in the issue tracking platform:

extracting a second information from the issue object; and modifying at least one of the one or more whiteboard elements to include the second information extracted from the issue object; and causing display of the modified at least one of the one or more whiteboard elements on the virtual canvas.

16. The method of claim 15, wherein:

the one or more whiteboard elements includes an identifier;

prior to causing creation of the issue object, a query is submitted to the issue tracking platform using the identifier;

in response to the query returning an existing issue object corresponding to the identifier, third information is extracted from the existing issue object; and the one or more whiteboard elements are modified to include the third information extracted from the existing issue object.

17. The method of claim 15, wherein:

in response to receiving the external object creation command:

the one or more whiteboard elements are analyzed to identify a set of tasks; and the whiteboarding platform causes creation of a set of issue objects, each object corresponding to a task of the set of tasks.

18. The method of claim 17, wherein in response to a completion of a respective issue object of the set of issue objects, a respective whiteboard element is modified to visually indicate the completion of the respective issue object.

19. The method of claim 15, wherein modifying the one or more whiteboard elements to include the second information includes replacing the one or more whiteboard elements with a structured element.

20. The method of claim 15, wherein:

subsequent to creating the issue object on the issue tracking platform, the one or more whiteboard elements are modified to include a selectable link; and in response to a user input provided to the selectable link, a current graphical user interface is redirected to a graphical user interface of the issue tracking platform.

* * * * *